June 28, 1955  D. GARTNER ET AL  2,711,904

SHIELD FOR WORK HOLDING COLLETS

Filed May 8, 1953

INVENTORS
WILLIAM H. SCHNEIDER
DAVID GARTNER
BY Archworth Martin
their ATTORNEY

United States Patent Office 2,711,904
Patented June 28, 1955

2,711,904

SHIELD FOR WORK HOLDING COLLETS

David Gartner and William H. Schneider, Pittsburgh, Pa.; said Gartner assignor to said Schneider Application May 8, 1953, Serial No. 353,732

1 Claim. (Cl. 279—1)

Our invention relates to collets of the chuck type for holding work pieces while they are being operated upon by cutting tools of lathes, etc.

In machine tool devices of this kind, difficulty arises through accumulation of shavings and fine metal particles in the collet, which interferes with the proper closing of the collet jaws and consequent inaccuracy of machine tooling.

Our invention has for its object the provision of a shield or protective device that will prevent the entry of metal particles such as cuttings into the collet and which is also of such form that the cutting of a work piece can be effected in close proximity to the head of the collet.

As shown in the accompanying drawing.

Figure 1:
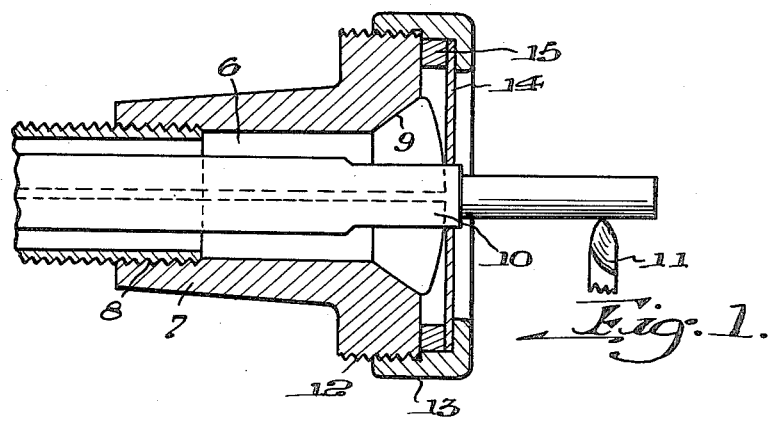
Figure 1 is a longitudinal sectional view through a collet equipped with my invention, showing a work piece therein.
Figure 2:
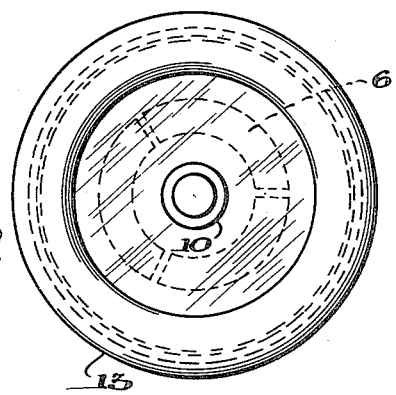
Fig. 2 is a face view thereof.

Referring first to Figs. 1 and 2, the collet jaws are represented by the numeral 6, and these may be of various conventional forms. A closing ring 7 of somewhat the usual form is employed and has threaded engagement at 8 with a holder for the shanks of the collet jaws 6, so that when it is turned in one direction, the camming surface at 9 will force the jaws 6 into gripping engagement with the shank end of a work piece 10, to hold the same while it is being operated upon by a cutting tool 11 or the like.

The member 7 is of somewhat the usual form except that it is exteriorly threaded at 12 for threaded engagement with a collar 13, which serves to hold a shield 14 tightly in engagement with the head of the collet, and against a packing ring 15 that may suitably be of metal or hard fibrous material. The shield or sealer disc 14 may be of thin metal or hard fiber, and has a hole whose wall closely surrounds the shank or base portion of the work piece 10, to thereby prevent the entry of cuttings to the jaws 6 or between such jaws and the clamping ring 7.

The disc 14 can be made quite thin thereby avoiding substantial interference with close cutting by the tool 11 at the base end of the work piece 10. Since the discs 14 can be made cheaply, they will be supplied with holes of various diameters to fit work pieces of various sizes.

Figure 3:
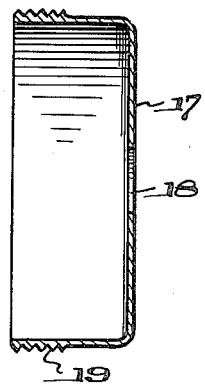
Fig. 3 is a sectional view showing a modified form of collet shield.
Figure 4:
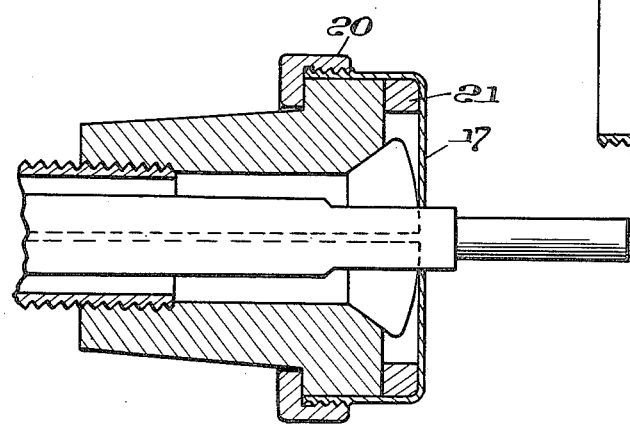
Fig. 4 is a sectional view through a portion of a collet that is equipped with the shield of Fig. 3.

Referring now to Figs. 3 and 4, I show a sealing cap 17 that has a central hole 18 to receive the shank of a work piece as in the case of the sealer disc 14. In this case, the member 17 is cup shaped and is threaded at 19 for engagement with a holding collar 20 that corresponds to the collar 13 of Fig. 1. Here, as in Fig. 1, a spacing ring 21 is provided between the end of the collet and the shield.

I claim as my invention:

The combination with a collet head and a closer ring for the jaws thereof, of a sealing plate having a central perforation through which the shank of a work piece may extend into the collet, of means engageable with the closer ring and releasably holding the plate against the forward face of the collet head, the said means comprising a collar held by the closer ring and a rearwardly-disposed ring-like extension from the periphery of the sealing plate and having screw-threaded connection with the said collar.

References Cited in the file of this patent

UNITED STATES PATENTS

| | | |
|---|---|---|
| 1,159,146 | Wood | Nov. 2, 1915 |
| 1,278,427 | Bocorselski | Sept. 10, 1918 |
| 1,930,586 | Delaval-Crow | Oct. 17, 1933 |
| 2,258,377 | Collins | Oct. 7, 1941 |
| 2,496,545 | Kraemer | Feb. 7, 1950 |